United States Patent
Hwang et al.

[11] Patent Number: 5,987,120
[45] Date of Patent: Nov. 16, 1999

[54] DEVICE FOR IDENTIFYING LINE REVERSAL/RINGING SIGNAL OF A TELEPHONE SET

[75] Inventors: Bar-Chung Hwang, Taoyuan; Jizoo Lin, Hsinchu, both of Taiwan

[73] Assignee: Winbond Electronics Corp., Taiwan

[21] Appl. No.: 08/980,725

[22] Filed: Dec. 1, 1997

[51] Int. Cl.[6] .................................................. H04M 1/00
[52] U.S. Cl. ........................................... 379/382; 379/372
[58] Field of Search .................................. 379/372, 373, 379/374, 382, 383, 399

[56] References Cited

U.S. PATENT DOCUMENTS

| | | | |
|---|---|---|---|
| 4,110,569 | 8/1978 | Schindler et al. | 379/382 |
| 4,122,308 | 10/1978 | Weinberger et al. | 379/131 |
| 4,354,264 | 10/1982 | Wurst | 370/384 |
| 4,429,185 | 1/1984 | Adrian et al. | 379/377 |
| 4,524,245 | 6/1985 | Littlefield | 379/373 |
| 4,698,840 | 10/1987 | Dively et al. | 379/112 |
| 4,768,227 | 8/1988 | Dively et al. | 379/112 |

*Primary Examiner*—Reinhard J. Eisenzopf
*Assistant Examiner*—Charles N. Appiah
*Attorney, Agent, or Firm*—Alan Kamrath; Oppenheimer, Wolff & Donnelly, LLP

[57] ABSTRACT

A device for identifying a line reversal signal and a ringing signal of a telephone set having a built-in ringing detection circuit includes a counter, a comparator and a latch connected with each other in series. The device can determine whether a signal on line is the line reversal signal or the ringing signal of the telephone set without using an installed CPU or a timer thereof, so as to save power and reduce the load of the CPU.

9 Claims, 1 Drawing Sheet

DEVICE FOR IDENTIFYING LINE REVERSAL/RINGING SIGNAL OF A TELEPHONE SET

BACKGROUND OF THE INVENTION

1. Field of the Invention

The present invention relates to a device for identifying line reversal/ringing signals of a telephone set, more particularly, to an identifying device for discriminating the line reversal signal and the ringing signal of the telephone set without using a CPU installed in the telephone set.

2. Description of Related Art

Currently, a telephone set or an answering machine usually with a function of discriminating a caller's ID has a built-in CPU to support main and additional functions. The CPU is transferred to a sleep mode to save power when the telephone set is not in use. A conventional method to identify a signal transmitted on line utilizes the CPU of the telephone set in cooperation with a built-in ringing detection circuit thereof to determine if the signal is a line reversal signal or a ringing signal. However, by such a method, the CPU must be transferred from the sleep mode to an operation mode, so that the load of the CPU is increased and excessive power is consumed.

Another conventional method utilizing a timer, which involves use of a clock signal, also consumes a lot of power.

SUMMARY OF THE INVENTION

One object of the present invention is to provide a device for identifying a line reversal signal and a ringing signal of a telephone set without using an installed CPU or a timer thereof, so as to save power and reduce the load of the CPU.

Another object of the present invention is to provide a device for identifying a line reversal signal and a ringing signal of a telephone set, said device having a simple structure.

A further object of the present invention is to provide a device for identifying a line reversal signal and a ringing signal of a telephone set, which can avoid incorrectness of identification due to a well known phenomenon referred to as "bounce" of a signal on line.

In accordance with one aspect of the present invention, the device for identifying the line reversal signal and the ringing signal of the telephone set comprises a counter, a comparator and a latch connected with each other in series. The counter utilizes a detect signal from a ringing detection circuit of the telephone set as an activate signal, so as to be activated to count when a signal is detected on line. The counted result of the counter is compared with a predetermined value in the comparator, and the compared result is transmitted to the latch. The latch latches the received signal when the activate signal ceases. Therefore, it can be determined if the signal on line is a line reversal signal or a ringing signal by observing an output of the latch.

In accordance with another aspect of the present invention, the device for identifying the line reversal signal and the ringing signal of the telephone set can comprise only the counter and the latch, wherein a specific output terminal of the counter is directly connected to the latch.

In accordance with a further aspect of the present invention, the device for identifying the line reversal signal and the ringing signal of the telephone set comprises only the counter and the latch, wherein the comparison is proceeded by a simple combination of some logic gates.

Other objects, advantages and novel features of the invention will become more apparent from the following detailed description when taken in conjunction with the accompanying drawings.

DETAILED DESCRIPTION OF PREFERRED EMBODIMENT

Figure 1:
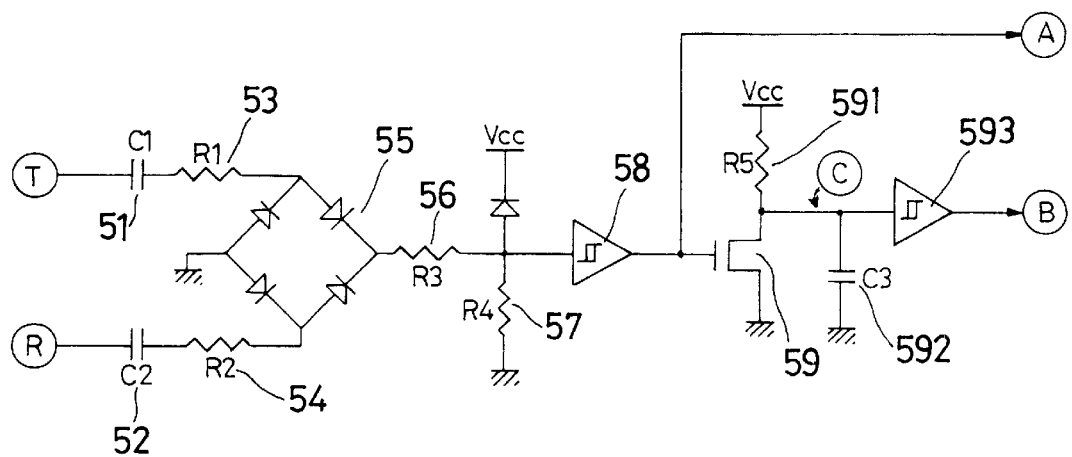
FIG. 1 is a schematic circuit diagram of a ringing detection circuit of a telephone set.

Referring to FIG. 1, a built-in ringing detection circuit of a telephone set takes a signal on line from a tip/ring terminal, and the signal is transmitted to a bridge rectifier 55 passing through a pair of capacitors 51, 52 for blocking direct current and a pair of balance resistors 53, 54. An output from the bridge rectifier 55 is transmitted to a first Schmitt trigger 58 to be converted into rectangular wave signals after the voltage of the output is reduced by a pair of voltage dividing resistors 56, 57. A MOS transistor 59 is turned on and off in correspondence with states of an output of the first Schmitt trigger 58 "A", so as to drive a capacitor 592 connected to a drain of the MOS transistor 59 to charge and discharge. The drain of the MOS transistor 59 is connected to VCC through a resistor 591. A second Schmitt trigger 593 is connected to the capacitor 592. An output of the second Schmitt trigger 593 is used as an output terminal "B" of the ringing detection circuit.

Figure 2:
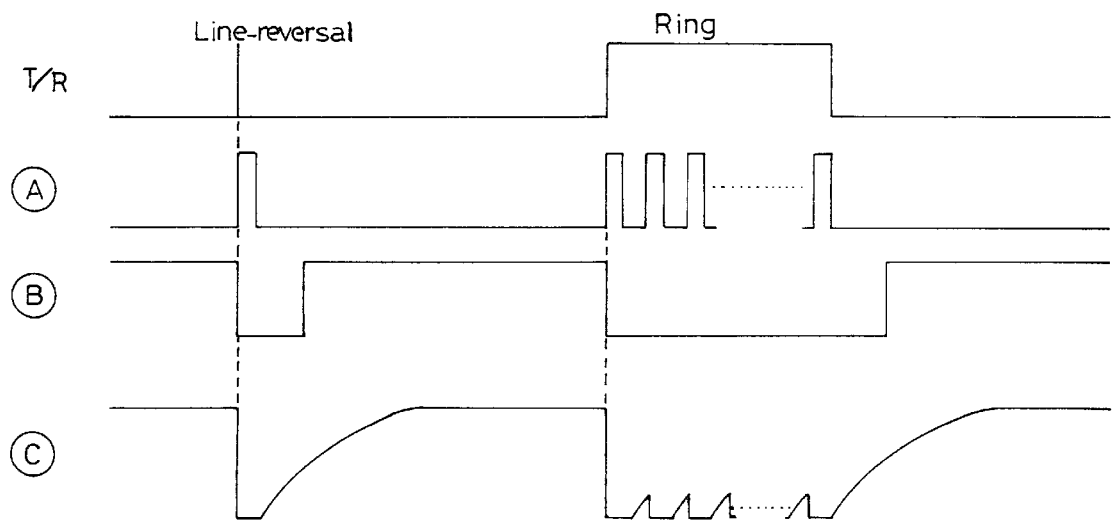
FIG. 2 is a timing chart showing an operation of the ringing detection circuit in FIG. 1.

The operation of the above ringing detection circuit will be described in detail with reference to FIG. 2.

If a line reversal signal with a form as a short impulse is transmitted from the tip/ring terminal, then a signal with a form of a single pulse is output from the output "A" of the first Schmitt trigger 58. If a ringing signal is transmitted from the tip/ring terminal, then a signal with a form of multiple pulses is output from the output "A" of the first Schmitt trigger 58.

The MOS transistor 59 is turned on and off in correspondence with the pulses. The capacitor 592 discharges when the MOS transistor 59 is turned on, while charging via the resistor 591 when the MOS transistor 59 is cut off. The resistance of the resistor 591 and the capacitance of the capacitor 592 are selected so that a RC time constant is not sufficient for the voltage level at the node "C" to be raised to high when the multiple pulses are transmitted continuously. Accordingly, the waveform at the node "C" appears to be an inverse narrow waveform when the signal is the line reversal signal, while being a substantially inverse wide waveform when the signal is the ringing signal. The resultant signal at the node "C" is then shaped into an inverse narrow pulse or an inverse wide pulse by the second Schmitt trigger 593 (output terminal "B").

Figure 3:
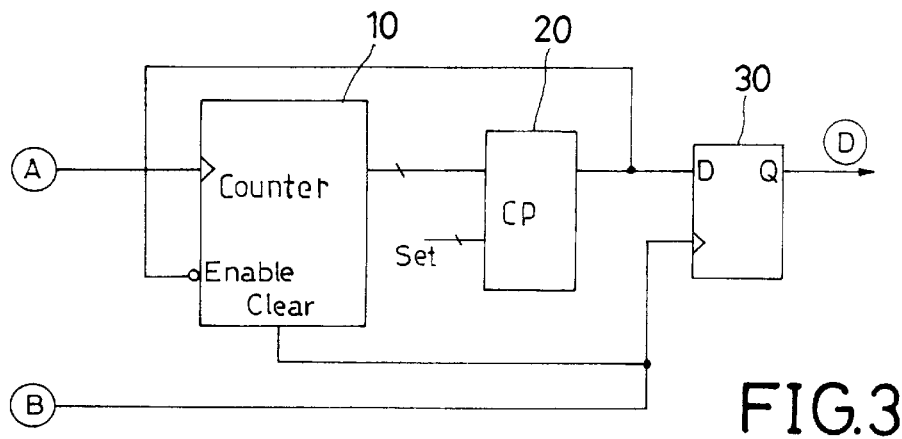
FIG. 3 is a block diagram showing a device for identifying a line reversal signal and a ringing signal of the telephone set in accordance with the present invention.

Referring to FIG. 3, the device for identifying the line reversal signal and the ringing signal of the telephone set in accordance with this embodiment of the present invention comprises a counter 10, a comparator 20 and a D-type latch 30. The output terminal "B" of the ringing detection circuit is connected to a terminal "CLEAR" of the counter 10 and a trigger terminal of the latch 30. A count input terminal of the counter 10 is connected to the node "A" of the ringing detection circuit. An output of the counter 10 is connected with one of two input terminals of the comparator 20, while a predetermined value is sent to the other input terminal, "SET", of the comparator 20. An output of the comparator 20 is fed back to a terminal "ENABLE" and connected to an input terminal "D" of the latch 30.

In this case, the predetermined value is set to be a value larger than 1.

When the signal at node "B" transits to low, the counter 10 is driven to count according to the pulse(s) from node "A". The output of the counter 10 indicating the number of the pulse(s) is transmitted to the comparator 20.

When the signal taken from the tip/ring terminal is a line reversal signal, there is only one pulse appearing at the node "A", and the output of the counter 10 indicates "one", which is smaller than the predetermined value at the terminal "SET" of the comparator 20, so that the output of the comparator 20 is low. When the signal at the node "B" is transited back to high, the latch 30 is triggered to latch the output of the comparator 20. Accordingly, the output of the latch 30 is low.

If the signal at node "A" is in the form of multiple continuous pulses, the value counted by the counter 10 will exceed the predetermined value of the comparator 20. Accordingly, the output of the comparator 20 is transited to be high. The counter 10 then stops counting since the high level output from the comparator 20 is fed back thereto. As can be seen in FIG. 2, the waveform at the node "B" appears to be the inverse wide pulse. When the signal at the node "B" returns to be high, the high level output from the comparator 20 is latched in the latch 30. Therefore, the output of the latch 30 is high.

As described above, the low level output of the latch 30 indicates that the signal on line is the line reversal signal in the form of a single pulse, while the high level output thereof indicates that the signal on line is the ringing signal in the form of multiple pulses. Accordingly, it is very easy to determine if the signal is the line reversal signal or the ringing signal.

In addition, since the number of the pulse(s) of the signal on line is counted by the counter 10, and the counted value is compared with the predetermined value in the comparator 20, the incorrectness of the determination for the signal due to surges and bounces previously occurring on line can be avoided.

Although the comparator 20 is used in this embodiment, the comparator 20 can be omitted, however. In the case that no comparator is used, a specific count output of the counter 10 is utilized to provide binary data of the counted values in sequence. Furthermore, the output of the counter 10 can be processed by logic gates.

The device for identifying the line reversal signal and the ringing signal of the telephone set in accordance with the present invention has the following advantages:

(1) no need for a clock signal: the device of the present invention utilizes the output of the built-in ringing detection circuit of the telephone set as an activate signal for the counter 10, the device of the present invention can operate normally without an additional clock signal. Therefore, it is not necessary for the device of the present invention to use a clock oscillator or a timing circuit, thereby attaining the goal for saving power;

(2) no need for using the CPU: the device of the present invention can operate independently of the CPU of the telephone set. Accordingly, the device of the present invention can proceed the operation of identification even when the CPU is in the sleep mode, thereby reducing the load of the CPU and saving power thereof;

(3) excellent capability for resisting noises: the device of the present invention utilizes the comparison of the counted result of the counter 10 with a threshold, that is, the predetermined value of the comparator 20. Accordingly, even if a bounce occurs in the signal on line, the incorrectness of determination can be avoided.

Although this embodiment in accordance with the present invention is for identifying the line reversal signal and the ringing signal of the telephone set having a function of discriminating the caller's ID, the present invention can also be applied to a common telephone set without those functions.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A device for identifying a line reversal signal and a ringing signal of a telephone set having a built-in ringing detection circuit, said device located at the telephone set and comprising, in combination;

a counter activated and deactivated by an output signal from the built-in ringing detection circuit for counting the number of one or more pulses, and ceasing counting when the number of pulses counted exceeds a preset number of pulses indicative of a line reversal signal transmitted from the ringing detection circuit corresponding to a signal transmitted on line to obtain a counted value;

a comparator receiving the counted value for comparing said counted value with a predetermined value and outputting a result to indicate whether the counted value exceeds the predetermined value; and a latch receiving the result from the comparator and being triggered when a level transit occurs in the output signal of the ringing detection circuit to latch the voltage state of the result of the comparator.

2. The device as claimed in claim 1, wherein said latch is a D-type latch.

3. The device as claimed in claim 1, wherein said counter has a clear terminal thereof to be used as an activate/deactivate terminal.

4. The device as claimed in claim 1, wherein the result of said comparator is fed back to the counter, thereby stopping the counting of the counter when the voltage state of the result is transited.

5. The device as claimed in claim 1, wherein said comparator is composed of logic gates.

6. A device for identifying a line reversal signal and a ringing signal of a telephone set having a built-in ringing detection circuit, said device located at the telephone set and comprising:

a counter activated and deactivated by an output signal from the built-in ringing detection circuit for counting the number of one or more pulses and ceasing counting when the number of pulses counted exceeds a preset number of pulses indicative of a line reversal signal transmitted from the ringing detection circuit corresponding to a signal transmitted on line; and a latch connected to a specific count output terminal of said counter to receive counted data in sequence for latching the voltage state of the counted data when a level transit occurs in the output signal from the ringing detection circuit.

7. The device as claimed in claim 6, wherein said latch is a D-type latch.

8. The device as claimed in claim 6, wherein said counter has a clear terminal thereof to be used as an activate/deactivate terminal.

9. The device as claimed in claim 6, wherein the counted data from the specific count output terminal is fed back to the counter, thereby stopping the counting of the counter when the voltage state of the counted data is transmitted.

* * * * *